United States Patent Office 2,986,542
Patented May 30, 1961

2,986,542

PIGMENTED ARTIFICIAL RESIN LACQUERS DISPERSIBLE IN AQUEOUS MEDIA AND PROCESS FOR THEIR MANUFACTURE

Luzius Schibler, Riehen, and Hans R. Zbinden and Hans U. Gassmann, Basel, Switzerland, assignors to Ciba Limited, Basel, Switzerland No Drawing. Filed Dec. 30, 1958, Ser. No. 783,721

Claims priority, application Switzerland Feb. 18, 1957

6 Claims. (Cl. 260—21)

This is a continuation-in-part of our application Ser. No. 712,614, filed February 3, 1958, now abandoned.

Oil-in-water emulsions of water-insoluble hardenable resinous aminoplasts are known and are used for wide variety of purposes in the textile, leather and paper industries. As water-insoluble hardenable resinous aminoplasts there are used condensation products obtained from formaldehyde, a compound containing an amide group and capable of forming a hardenable resin with formaldehyde, and an alcohol of at most limited miscibility with water. For the preparation of emulsions there are generally used solutions of such condensation products in the alcohol used for the condensation. As emulsifying agents, which are capable of forming oil-in-water emulsions of the above kind, there are used protein substances, such as casein or advantageously ion-free products such as are obtained by the reaction of more than four molecular proportions of ethylene oxide with one molecular proportion of a water-insoluble compound containing a hydrocarbon radical of high molecular weight and at least one active hydrogen atom. For practical purposes it is usually necessary to render these lacquer resin emulsions stable by withdrawing therefrom at least a part of the substantially water-immiscible higher alcohol serving as solvent for the resin, for example, by evaporation. If it is attempted to incorporate a pigment with such an emulsion of an aminoplast resin there is obtained, especially in the case of pigment dyestuffs of relatively high specific gravity, either a thick paste which is difficult to stir and disperse or, if the emulsion is of thinner consistency, a paste having a strong tendency to form sediment. Stable preparations suitable for use cannot be obtained in this manner.

The present invention is based on the observation that anhydrous artificial resin lacquers which contain a pigment and are easily dispersible in aqueous media, and can be stored without producing sediment, are obtained by dispersing an inorganic pigment in a lacquer containing a hardenable water-insoluble etherified methylol compound of a substance of amide character capable of forming a hardenable aminoplast with formaldehyde and at least one organic solvent of at most limited miscibility with water, and adding, at the latest before any operation that follows the dispersing of the pigment, an emulsifying agent which is soluble in the lacquer and in water. In this manner there are obtained stable anhydrous pastes which do not produce sediment and are in most cases distinctly thixotropic and have a viscous consistency after being stirred up.

As hardenable water-insoluble etherified methylol-compounds there are used products such as are obtained in known manner by etherifying with an alcohol of at most limited miscibility with water, for example, n-butanol, amyl alcohol, hexyl alcohol, cyclohexanol or benzyl alcohol, a methylol-compound of a substance of amide character capable of forming a hardenable aminoplast with formaldehyde, such as guanidine, dicyandiamide, biuret, thiourea and especially urea, and also aminotriazines containing at least two primary amino groups capable of reacting with formaldehyde, such as benzoguanamine, acetoguanamine, formoguanamine and especially melamine. As an excess of the aforesaid alcohol is generally used for the etherification, there is obtained directly a solution of the etherified methylol-compound in an alcohol of at most limited miscibility with water, that is to say, a resin lacquer, which can be used in the process of this invention. However, the alcohol used as solvent may be partially or wholly replaced by another organic solvent which is substantially immiscible with water, for example, 2-ethyl-hexanol, lacquer and solvent benzine boiling at 140–200° C., or especially xylene, whereby a resin lacquer especially suitable for the process of this invention can be obtained.

If an excess of n-propyl alcohol is used for the etherification of the aforesaid methylol compounds, said excess is substantially completely removed from the resulting solutions of the hardenable water-insoluble n-propylated methylol compounds, and said alcohol is then replaced by an organic solvent of at most limited miscibility with water.

There may also be used for making the artificial resin lacquers hardenable water-insoluble etherified methylol-compounds which contain, in addition to the ether radicals, radicals of carboxylic acids containing more than 8 carbon atoms, especially 9–22 carbon atoms such as pelargonic acid, lauric acid, myristic acid, palmitic acid, oleic acid, stearic acid, arachidic acid, behenic acid, or soya bean fatty acid. When such acid radicals of high molecular weight are present, the compounds may be derived from methylol ethers of water-soluble alcohols of low molecular weight, for example, methylol methyl ethers. The method of making such hardenable water insoluble etherified methylol-compounds is also known.

Accordingly, in the present invention there may be used hardenable water-insoluble etherified methylol compounds of substances of amide character capable of forming hardenable aminoplasts with formaldehyde, in which the oxygen atom of at least one methylol group is bound to a hydrocarbon radical containing more than two carbon atoms, preferably 3–8 carbon atoms, or in which the oxygen atom of at least one methylol group is bound to a hydrocarbon radical containing one or more carbon atoms, for example, 2 or 4 carbon atoms, and the oxygen atom of at least one other methylol group is bound to the acyl group of a fatty acid containing more than 8 carbon atoms, preferably 9–22 carbon atoms.

As organic solvents of at most limited miscibility with water there may be used, on the one hand, the alcohols mentioned above and, on the other, water-immiscible organic solvents such as 2-ethyl-hexanol, toluene, chlorobenzene, tetrahydronaphthalene, white spirit or especially xylene.

In the process of this invention there are used inorganic pigments, for example, titanium dioxide, ultramarine, cadmium sulfide, chrome yellow, gold bronze or iron oxides.

As emulsifying agents which are soluble in resin lacquers of the above kind and also in water, there are used reaction products of 1 mol of a water-insoluble organic compound having from about 8 to about 24 carbon atoms and containing at least one reactive hydrogen atom with from about 8 to about 100 mols of ethylene oxide. More particularly, there may be mentioned ethylene oxide condensation products of water-insoluble organic compounds corresponding to the general formula

R—X—H wherein R represents a hydrocarbon radical having from 8 to 20 carbon atoms and X stands for —COO—, —CO—NH—, —O—, —S— or —NH—, for example, ethylene oxide condensation products of resin acids, higher fatty acids, such as palmitic acid and stearic acid, of higher fatty acid amides, of higher alkylamines, such as dodecylamine, octadecylamine, octadecenylamine or mixtures of such amines, of higher alkyl-mercaptans, such as dodecylmercaptan and hexadecyl-mercaptan, and especially products obtainable by the reaction of 8 to 100 mols of ethylene oxide with 1 mol of a hydroxyl-compound of the formula

R—OH wherein R has the same meaning as above, for example, with 1 mol of a higher monohydric alcohol, such as dodecyl alcohol, cetyl alcohol, octadecyl alcohol, oleyl alcohol, ricinoleic alcohol, montan alcohols, or hydroabietyl alcohol, or with one molecular proportion of an alkyl-phenol, such as isohexyl-phenol, octyl-phenol, iso-octyl-resorcinol, dodecyl-phenol, pentadecyl-phenol or octadecyl-phenol. Such emulsifying agents are either known or can be made by methods in themselves known. Emulsifying agents suitable for carrying out the process are, for example, reaction products of one molecular proportion of hydroabietyl alcohol or octylphenol with 25 or 100 molecular proportions or 20–30 molecular proportions of ethylene oxide, the reaction product of 1 mol of dodecyl-phenol with 10 molecular proportions of ethylene oxide, the reaction product of 1 mol of dodecyl mercaptan or hydroabietylamine with 15 mols of ethylene oxide, the reaction product of 1 mol of stearic acid and 50 mols of ethylene oxide, and also the reaction product of 1 mol of commercial oleylamine and 8 mols of ethylene oxide. Instead of using a single pigment, lacquer resin, solvent and emulsifying agent two or more of any of these substances may be used in making a resin lacquer.

The proportions of the ingredients (1) inorganic pigment, (2) organic solvent of at most limited miscibility with water, (3) hardenable water-insoluble etherified methylol compound of the kind described, and (4) specified emulsifying agent of the anhydrous pigmented artificial resin lacquers of the instant invention are critical but may vary within certain limits. Thus, the anhydrous pigmented artificial resin lacquers of the instant invention should consist of 20 to 60, preferably 25 to 50, parts by weight, of inorganic pigment, of 10 to 40 preferably of 12 to 30, parts by weight, of hardenable water-insoluble etherified methylol compound, of 10 to 50 preferably 15 to 45, parts by weight of organic solvent of at most limited miscibility with water, and of 2 to 30, preferably 6 to 20, parts by weight of the emulsifying agent specified.

The process may be carried out, for example, by grinding the inorganic pigment in the resin lacquer and then adding the emulsifying agent of the kind described above to the pigmented lacquer, or by mixing together the emulsifying agent, pigment and resin lacquer and finely grinding the mixture, for example, in a roller mill. Alternatively the emulsifying agent may be added to the resin lacquer and the pigment ground in the resulting mixture. The emulsifying agent must be added at the latest before any operation that follows the dispersing of the pigment. When a pigmented artificial resin lacquer obtained in the above manner is introduced into an aqueous medium, for example, in one which contains the binding agent, the emulsifying agent passes into the aqueous phase and brings about emulsification of the pigmented resin lacquer in a surprisingly easy manner and a pigmented oil-in-water emulsion is formed. Especially stable pigmented emulsions are obtained with resin lacquers of which the solvent consists substantially wholly of a solvent immiscible with water, for example, xylene, and are therefore substantially free from higher alcohols, for example, n-butanol. Such lacquers are obtained, for example, by diluting the original lacquer resin solution with xylene followed by azeotropic distillation whereby alcohol, for example, n-butanol is removed and replaced by xylene. Pigmented artificial resin lacquers so obtained are especially suitable for working up with binding agents which contain homopolymer or copolymer latices and are therefore sensitive to additions having a coagulation action. By suitably selecting the resin and the solvent, pigmented artificial resin lacquers can easily be obtained in accordance with the invention in a form which inhibits sedimentation of the inorganic pigment and nevertheless, ensures easy dispersion of the composition in aqueous media. As aqueous media there may be used more especially aqueous binding agents, such as are used for fixing pigments on fibrous materials, namely aqueous suspensions of resins, homopolymers or copolymers as such or in combination with so-called water-soluble precondensates, for example, water-soluble methylol-compounds of urea or melamine. Preparations produced with the pigmented resin lacquers of this invention and the aforesaid aqueous binding agents may also contain thickening agents, for example, methylcellulose, casein or tragacanth, or emulsion thickener, such as are especially suitable for pigment printing, and also plasticisers.

The pigmented artificial resin lacquers of this invention can be used whenever it is desired to incorporate an inorganic pigment and a hardenable aminoplast resin in an aqueous medium, for example, in textile printing colors.

The following examples illustrate the invention, the parts being by weight unless otherwise stated and the relationship of parts by weight to parts by volume being the same as that of the kilogram to the liter.

*Example 1*

50 parts of ultramarine blue are finely ground in a stone dispersion-mill in 25 parts of a solution in cyclohexanol of a urea-formaldehyde condensation product etherified with cyclohexanol (the solution having a dry content of about 53%) and 17 parts of 2-ethyl-hexanol. Before or after the grinding operation there are added to the lacquer 8 parts of a condensation product of one molecular proportion of hydroabietyl alcohol and 15 molecular proportions of ethylene oxide. There are obtained 100 parts of a viscous homogeneous paste, which is easily dispersible in water on an aqueous binding agent.

The urea-formaldehyde-cyclohexanol condensate in cyclohexanol used in this example may be prepared as follows: 2150 parts of paraformaldehyde and 2000 parts of urea are suspended in 5000 parts of methyl alcohol. The pH is adjusted to 8.5 with 20 parts of 30% caustic soda solution and the mixture stirred at 30–35° C. for 72 hours.

A thick paste of dimethylol urea in methanol is obtained after that time. 1310 parts of this paste are stirred with 1000 parts of cyclohexanol, 11.5 parts of 4 N-hydrochloric acid are added quickly and the mixture heated at 50° C. for 10 minutes. The dimethylolurea dissolves completely. The reaction mass is filtered and the filtrate evaporated under reduced pressure until 850 parts are left. Finally, cyclohexanol is added to make up 1250 parts. There is obtained an anhydrous syrupy solution with a content of dry resin of about 53%.

*Example 2*

30 parts of red iron oxide are ground in a wet-color-mill in a mixture of 25 parts of a melamine-formaldehyde condensation product etherified with n-butanol, which is substantially free from butanol, 20 parts of xylene and 15 parts of white spirit. To the thinly viscous liquor there are added 10 parts of the condensation product of one molecular proportion of hydroabietyl alcohol and 25 molecular proportions of ethylene oxide, which easily dissolves upon slight heating. There are obtained 100 parts of a distinctly thixotropic paste, which is stable to storage and can be stirred into an aqueous thickening or binding agent as easily as an aqueous pigment paste.

The butanol-free lacquer prepared with the aforesaid etherified melamine-formaldehyde condensation product and xylene, can be obtained as follows:

1 part of a solution in butanol of a melamine-formaldehyde condensation product etherified with n-butanol (the solution having a dry content of about 75%) is diluted with 1 part of meta-xylene. 1 part of the solvent is distilled from the diluted resin solution under 15 millimeters pressure at a temperature not exceeding 70° C. in such manner that the final concentration of resin is the same as it was before dilution. The butanol originally present is azeotropically removed in this manner and the resin solution which remains contains substantially only xylene as solvent.

The aforesaid melamine-formaldehyde condensation product etherified with n-butanol in butanol can be made in any manner known to the art, e.g. by etherifying the condensation product of 1 mol of melamine and about 4 mols of formaldehyde with an excess of n-butanol and concentrating the resulting butanol solution of the butylated melamine-formaldehyde condensate until a solution having a dry content of about 75% is obtained.

The paste obtained in the manner described above can be used in the following manner for printing textiles: 100 parts of the above pigment paste are stirred into 800 parts of an emulsion of the oil-in-water type consisting of (a) A solution of 22 parts of a non-ionic emulsifying agent obtained by the additive combination of ethylene oxide with hydroabietyl alcohol and subsequent treatment with 4:4'-diphenylmethanediisocyanate, in 269.2 parts of water, which solution constitutes the external phase;

(b) 38.4 parts of a copolymer of 60% styrene and 40% butadiene;

(c) 7.2 parts of the aforesaid melamine-formaldehyde condensation product etherified with n-butanol and 0.8 part of a highly viscous dimethyl silicone fluid (as antifoaming agent) dissolved in 2.4 parts of n-butanol;

(d) 460 parts of petroleum having a boiling range of 160–240° C., the ingredients (b), (c) and (d) each constituting a separate disperse phase.

There is immediately obtained by gentle stirring a homogeneous salve-like paste of the oil-in-water type. By diluting the mixture with 80 parts of water and adding 20 parts of an aqueous solution of 50% strength of ammonium nitrate there are obtained 1000 parts of a printing paste, which can be applied to a fabric by the usual methods, for example, by means of an engraved roller or a stencil, and produces very sharp brown pattern effects.

After being dried at the ordinary or a raised temperature the prints may be subjected to a short heat treatment at 130–150° C. or to treatment in an atmosphere of steam, whereby the prints are fixed fast to washing and rubbing.

The non-ionic emulsifying agent named above under (a) may be prepared as follows:

1 mol of hydroabietyl alcohol and 200 mols of ethylene oxide are additively combined under atmospheric pressure at a temperature of about 160–180° C. with the use of 2% (calculated on the hydroabietyl alcohol) of metallic sodium as catalyst. There is formed a brittle, wax-like, hard and water-soluble mass of melting point 55° C. The molten anhydrous product is treated at 60–110° C. with 1% by weight of hexamethylene-1,6-diisocyanate. Within a few minutes a viscous melt is obtained which solidifies below 50° C. to form a water-soluble wax-like mass.

*Example 3*

50 parts of titanium dioxide (titanium white) are dispersed on a wet color mill in 20 parts of a solution in butyl alcohol of a benzoguanamine-formaldehyde condensation product etherified with n-butanol (the solution having a dry content of about 70%) and 20 parts of xylene. To the resulting lacquer are added 10 parts of the addition product of 20 molecular proportions of ethylene oxide with 1 mol of ricinoleic alcohol. There are obtained 100 parts of a thick paste which can easily be stirred into an emulsion of the oil-in-water type of the kind described in Example 2 and can be used for printing textile fabrics.

The aforesaid solution of the butylated benzoguanamine-formaldehyde condensation product may be prepared according to known methods, e.g. by etherifying the condensation product of 1 mol benzoguanamine and 3–4 mols of formaldehyde with an excess of n-butanol and concentrating the resulting butanol solution of the butylated benzoguanamine-formaldehyde condensate until a solution having a dry content of about 70% is obtained.

*Example 4*

To a ground pigment color consisting of 35 parts of cadmium sulfide yellow, 30 parts of a solution of about 75% of butylated dimethylol-urea in n-butanol, 10 parts of dioctyl phthalate and 13 parts of xylene are added 12 parts of a condensation product of octyl phenol with 20 molecular proportions of ethylene oxide. There are obtained 100 parts of a thickish thixotropic paste, which assumes a thinly viscous consistency after being stirred. It can be stirred into aqueous binding agents such as aqueous pigment pastes.

*Example 5*

30 parts of red iron oxide, 30 parts of the solution in butyl alcohol of a melamine-formaldehyde condensation product etherified with n-butanol (the solution having a dry content of about 75%) of Example 2, 20 parts of xylene, 10 parts of solvent benzine, 8 parts of a condensation product of one molecular proportion of hydroabietyl alcohol with 25 mols of ethylene oxide and 2 parts of a condensation product of one molecular proportion of hydroabietyl alcohol with 100 molecular proportions of ethylene oxide, are mixed together, and then finely ground in a roller mill. There are obtained 100 parts of a thixotropic paste that is easily dispersible in aqueous binding agents.

The above paste can be used, for example, in combination with a petroleum emulsion of the oil-in-water type for printing textiles.

*Example 6*

30 parts of red iron oxide, 30 parts of the solution of a melamine-formaldehyde condensation product etherified with n-butanol in butyl alcohol (the solution having a dry content of about 75%) of Example 2, 16 parts of solvent benzine, 21.6 parts of xylene, 0.4 part of triethanolamine and 2 parts of a condensation product of 1 mol of hydroabietyl alcohol and 100 parts of ethylene oxide are mixed together. By grinding the mixture there is obtained a paste which does not produce sediment, is slightly thixotropic and is dispersible in aqueous binding agents.

*Example 7*

30 parts of a gold bronze pigment are ground in a mixture of 37.5 parts of a methylol-melamine allyl ether modified with soya bean fatty acid (prepared by etherifying with about 44 parts of allyl-alcohol the condensation product obtainable from 19 parts of melamine and about 23 parts of formaldehyde [cf. U.S. Patent No. 2,197,357] followed by esterification with about 14 parts of soya bean fatty acid), 7.5 parts of a cobalt dryer of 2% strength in petroleum and 10 parts of a condensation product of dodecyl-phenol with 10 molecular proportions of ethylene oxide. There are obtained 100 parts of a thick slightly thixotropic paste, which disperses well in water and aqueous media.

*Example 8*

In a wet-color mill, 25 parts of cadmium sulfide yellow are ground in a lacquer consisting of 35 parts of the 75% solution (A) described below of a melamine-formaldehyde condensation product etherified with n-propanol, 20 parts of xylene, and 20 parts of a condensation product from 1 mol of hydroabietyl alcohol and 15 mols of ethylene oxide. There is obtained a stable dyestuff concentrate which can be stirred easily and which is readily dispersible in an aqueous binding agent.

The afore-mentioned solution (A) can be made as follows:

306 parts of hexamethylol-melamine (cf. U.S. Patent 2,197,357, Example 1) are suspended in 500 parts of n-propyl alcohol and 100 parts of water. 30 parts of concentrated hydrochloric acid of 30% strength by weight are added, and the mixture is stirred and heated at 35° C. for 4 hours, the hexamethylol-melamine dissolving rapidly. After 4 hours, the reaction mass is neutralized with 34 parts of caustic soda solution of 30% strength by weight. The mixture is transferred into a separating funnel, and the supernatant resin layer is separated after some time from the sodium chloride solution. Under a low vacuum, the resin solution is then evaporated to 600 parts, then diluted with 600 parts of m-xylene, and evaporation under reduced pressure continued until the weight of the reaction mass is 600 parts (a mixture of xylene and propanol passing over).

There is obtained a clear syrupy solution having a dry content of about 75%.

*Example 9*

In a wet-color mill, 35 parts of red iron oxide are ground in a mixture consisting of 25 parts of the butylated melamine-formaldehyde condensation product free from butanol as described in Example 2, 15 parts of solvent benzene, 15 parts of xylene and 10 parts of a condensation product from 1 mol of commercial oleylamine and 8 mols of ethylene oxide. There is obtained an anhydrous pigment concentrate which is readily dispersible in aqueous binding agents, as described in Example 2.

Instead of the condensation product from 1 mol of commercial oleylamine and 8 mols of ethylene oxide the same quantity of one of the following condensation products can be used:

That from 1 mol of hydroabietylamine and 15 mols of ethylene oxide;
That from 1 mol of hydroabietic acid and 15 mols of ethylene oxide;
That from 1 mol of stearic acid and 50 mols of ethylene oxide;
That from 1 mol of dodecyl mercaptan and 15 mols of ethylene oxide.

What is claimed is:

1. An hydrous pigmented artificial resin lacquer that is easily dispersible in an aqueous medium, which lacquer consists of a dispersion of (1) an inorganic pigment in a resin lacquer consisting substantially of (2) at least one organic solvent of at most limited miscibility with water and of (3) a hardenable water-insoluble etherified methylol compound selected from the group consisting of (a) a methylol-urea in which at least one methylol group is etherified with a monohydric alcohol having 3 to 8 carbon atoms, (b) a methylol-melamine in which at least one methylol group is etherified with a monohydric alcohol having 3 to 8 carbon atoms, (c) a methylol-benzoguanamine in which at least one methylol group is etherified with a monohydric alcohol having 3 to 8 carbon atoms, and (d) a methylol-melamine in which at least one methylol group is etherified with a monohydric alcohol having 1 to 4 carbon atoms and in which at least one other methylol group is esterified with a fatty acid having 9 to 22 carbon atoms, and (4) an emulsifying agent which is soluble in the lacquer and in water and which is a condensation product of one mol of a water-insoluble organic hydroxyl compound of the formula R—OH, wherein R represents a hydrocarbon radical having from 8 to 24 carbon atoms, with 8 to 100 mols of ethylene oxide, the amount of compound (1) ranging from 25 to 50 parts by weight, the amount of component (2) ranging from 15 to 45 parts by weight, the amount of component (3) ranging from 10 to 30 parts by weight and the amount of component (4) ranging from 6 to 20 parts by weight.

2. An anhydrous pigmented artificial resin lacquer that is easily dispersible in an aqueous medium, which lacquer consists of a dispersion of (1) an ultramarine blue pigment in a lacquer consisting substantially of (2) cyclohexanol and 2-ethyl-hexanol and of (3) a urea-formaldehyde condensation product etherified with cyclohexanol, and (4) an emulsifying agent which is soluble in the lacquer and in water and which is the reaction product of 1 mol of hydroabietyl alcohol with 15 mols of ethylene oxide, the amount of component (1) being about 50 parts by weight, the amount of component (2) being about 29 parts by weight, the amount of component (3) being about 13 parts and the amount of component (4) being about 8 parts.

3. An anhydrous pigmented artificial resin lacquer that is easily dispersible in an aqueous medium, which lacquer consists of a dispersion of (1) about 35 parts by weight of a cadmium sulfide yellow pigment in a lacquer consisting of (2) about 7 parts by weight of n-butanol, about 10 parts by weight of dioctyl phthalate, about 13 parts by weight of xylene and of (3) about 23 parts by weight of an urea-formaldehyde condensation product etherified with n-butanol, and (4) about 12 parts of a condensation product of 1 mol of octyl phenol with 20 mols of ethylene oxide.

4. An anhydrous pigmented artificial resin lacquer that is easily dispersible in an aqueous medium which lacquer consists of a dispersion of (1) about 30 parts by weight of a red iron oxide pigment in a lacquer consisting of (2) about 20 parts by weight of xylene, about 15 parts by weight of white spirit and of (3) about 25 parts of a melamine-formaldehyde condensation product etherified with n-butanol, and (4) about 10 parts by weight of the reaction product of 1 mol of hydroabietyl alcohol with 26 mols of ethylene oxide.

5. An anhydrous pigmented artificial resin lacquer that is easily dispersible in an aqueous medium, which lacquer consists of a dispersion of (1) about 30 parts by weight of a gold bronze pigment in a lacquer consisting substantially of (2) about 10 parts of xylene, about 8 parts by weight of a cobalt dryer of 2% strength in petroleum and of (3) about 37 parts by weight of a methylol-melamine allyl ether modified with soya bean fatty acid, and (4) about 15 parts by weight of the reaction product of 1 mol of dodecyl phenol with 10 mols of ethylene oxide.

6. A process for the manufacture of an anhydrous pigmented artificial resin lacquer that is easily dispersible in an aqueous medium, which process consists of dispersing (1) an inorganic pigment in a lacquer consisting of (2) at least one organic solvent of at most limited miscibility with water and (3) a hardenable water-insoluble etherified methylol compound selected from the group consisting of (a) a methylol-urea in which at least one methylol group is etherified with a monohydric alcohol having 3 to 8 carbon atoms, (b) a methylol-melamine in which at least one methylol group is etherified with a monohydric alcohol having 3 to 8 carbon atoms, (c) a methylol-benzoguanamine in which at least one methylol group is etherified with a monohydric alcohol having 3 to 8 carbon atoms, and (d) a methylol-melamine in which at least one methylol group is etherified with a monohydric alcohol having 1 to 4 carbon atoms and in which at least one other methylol group is esterified with a fatty acid having 9 to 22 carbon atoms and adding (4) an emulsifying agent which is soluble in the lacquer and in water and which is a condensation product of one mol of a water-insoluble organic hydroxyl compound of the formula R—OH, wherein R represents a hydrocarbon radical having from 8 to 24 carbon atoms, with 8 to 100 mols of ethylene oxide, the amount of component (1) ranging from 25 to 50 parts by weight, the amount of component (2) ranging from 15 to 45 parts by weight, the amount of component (3) ranging from 10 to 30 parts by weight and the amount of component (4) ranging from 6 to 20 parts by weight.

References Cited in the file of this patent

UNITED STATES PATENTS

| | | |
|---|---|---|
| 1,970,578 | Schoeller et al. | Aug. 21, 1934 |
| 2,539,914 | Kuhn | Jan. 30, 1951 |
| 2,586,098 | Schibler | Feb. 19, 1952 |
| 2,637,621 | Auer | May 5, 1953 |
| 2,681,322 | Auer | June 15, 1954 |

OTHER REFERENCES

Speel: Textile Chemicals and Auxiliaries, pp. 72–79, 85, 90, 325–37 and 331–33, Reinhold (1952).